(12) United States Patent
Drake et al.

(10) Patent No.: US 7,734,970 B2
(45) Date of Patent: *Jun. 8, 2010

(54) SELF-RESETTING, SELF-CORRECTING LATCHES

(75) Inventors: Alan J. Drake, Round Rock, TX (US); AJ KleinOsowski, Austin, TX (US); Andrew K. Martin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 142 days.

This patent is subject to a terminal disclaimer.

(21) Appl. No.: 12/168,142

(22) Filed: Jul. 6, 2008

(65) Prior Publication Data
US 2009/0037798 A1 Feb. 5, 2009

Related U.S. Application Data

(63) Continuation of application No. 11/242,491, filed on Oct. 3, 2005, now Pat. No. 7,418,641, which is a continuation-in-part of application No. 11/191,655, filed on Jul. 28, 2005, now Pat. No. 7,415,645.

(51) Int. Cl.
*G01R 31/28* (2006.01)
(52) U.S. Cl. .................................. 714/726
(58) Field of Classification Search ................ 714/726
See application file for complete search history.

(56) References Cited

U.S. PATENT DOCUMENTS

| | | | |
|---|---|---|---|
| 4,239,982 A * | 12/1980 | Smith et al. ............... 327/142 |
| 4,375,683 A * | 3/1983 | Wensley .................... 714/12 |
| 5,144,230 A * | 9/1992 | Katoozi et al. ............. 324/537 |
| 5,307,142 A | 4/1994 | Corbett et al. |
| 6,028,983 A | 2/2000 | Jaber |
| 6,127,864 A | 10/2000 | Mavis et al. |
| 6,504,410 B2 | 1/2003 | Waldie et al. |
| 6,504,411 B2 | 1/2003 | Cartagena |
| 6,538,488 B2 | 3/2003 | Zhang et al. |
| 6,826,090 B1 | 11/2004 | Chu et al. |
| 7,071,749 B2 * | 7/2006 | Gardner ..................... 327/202 |
| 7,539,931 B2 * | 5/2009 | Thayer ..................... 714/797 |

* cited by examiner

*Primary Examiner*—James C Kerveros
(74) *Attorney, Agent, or Firm*—Libby Z. Handelsman; Jack V. Musgrove (57) ABSTRACT

A latch circuit having three latch stages generates a majority output value from the stages, senses when the latch stage outputs are not all equal, and feeds the majority output value back to inputs of the latch stages to reload the latch stages. The latch circuit uses a not-equal gate whose output is an error signal that can be monitored to determine when a single-event upset has occurred. A master stage is controlled by a first multiplexer which receives one system clock signal, while a slave stage is controlled by a second multiplexer which receives another system clock signal, and the latch stage outputs are connected to respective inputs of the not-equal gate, whose output is connected to second inputs of the multiplexers. The latch circuit is part of a latch control system, and reloading of the latch stages takes less than one cycle of the system clock (less than 500 picoseconds).

13 Claims, 8 Drawing Sheets

SELF-RESETTING, SELF-CORRECTING LATCHES

CROSS-REFERENCE TO RELATED APPLICATION

The application is a continuation of U.S. patent application Ser. No. 11/242,491 filed Oct. 3, 2005, now U.S. Pat. No. 7,418,641, which is a continuation-in-part of U.S. patent application Ser. No. 11/191,655 filed Jul. 28, 2005, now U.S. Pat. No. 7,415,645, which is hereby incorporated

STATEMENT REGARDING FEDERALLY SPONSORED RESEARCH OR DEVELOPMENT

This invention was made with Government support under PERCS II, DARPA contract NBCH3039004. THE GOVERNMENT HAS CERTAIN RIGHTS IN THIS INVENTION.

BACKGROUND OF THE INVENTION

1. Field of the Invention

The present invention generally relates to computer systems, specifically to a method of storing values in latches of a computer system, and more particularly latches which store state information for extended periods of time.

2. Description of the Related Art

Figure 1:
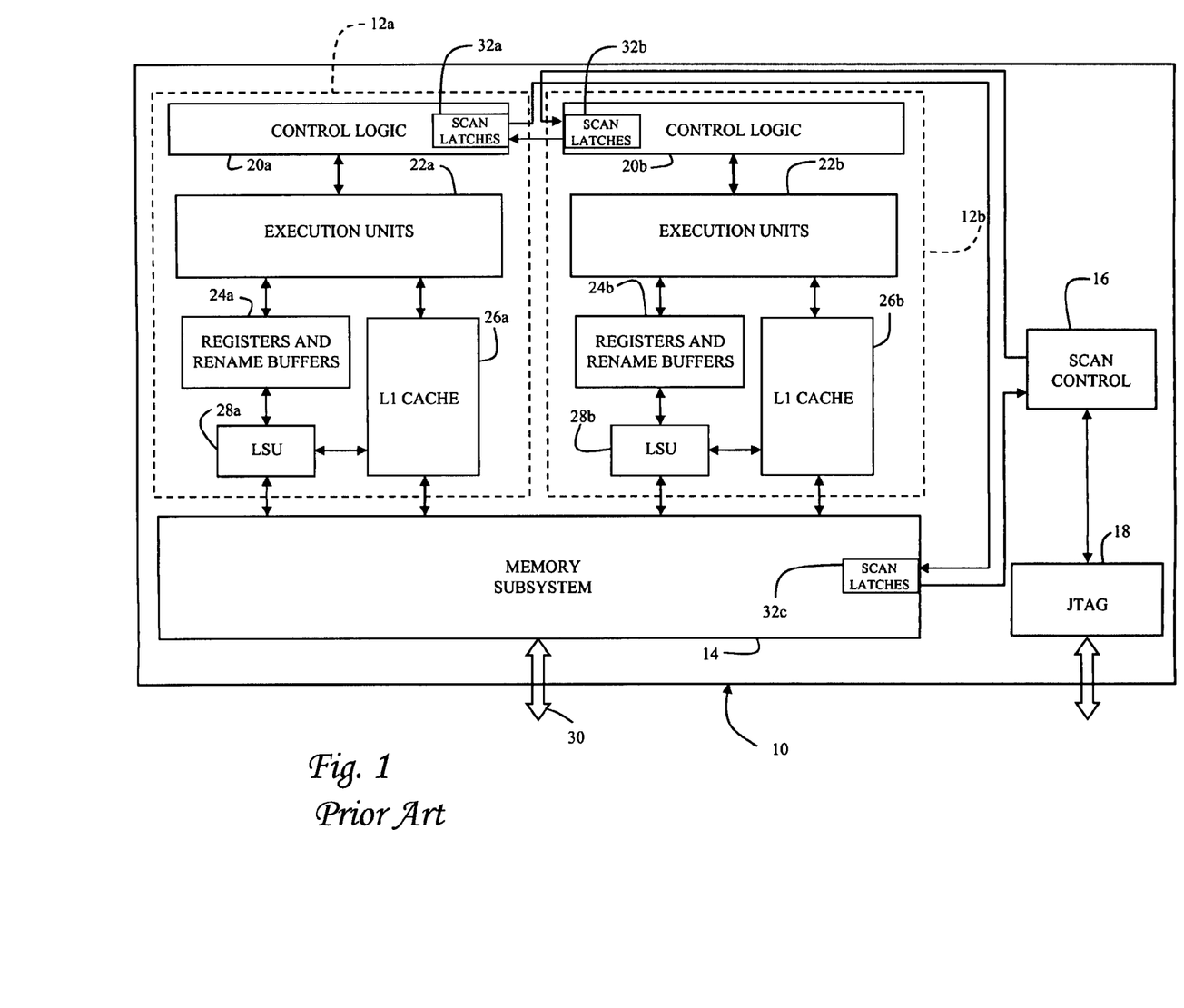
FIG. 1 is a block diagram of a conventional processing unit for a computer system which uses scan latches to store control information.

The basic structure of a conventional processing unit 10 for a computer system is shown in FIG. 1. In this example processing unit 10 is a dual-core processor having two processor cores 12a and 12b which carry out program instructions in order to operate the computer. Processing unit 10 also includes a memory subsystem 14, a scan controller 16, and a JTAG interface 18. The computer system may be a symmetric multi-processor (SMP) computer which uses a plurality of processing units 10 that are generally identical, that is, they all use a common set or subset of instructions and protocols to operate, and generally have the same architecture. An exemplary processing unit includes the POWER5™ processor marketed by International Business Machines Corp. which comprises a single integrated circuit superscalar microprocessor.

Each processor core 12a, 12b has its own control logic 20a, 20b, separate sets of execution units 22a, 22b and registers/buffers 24a, 24b, respective first level (L1) caches 26a, 26b, and load/store units (LSUs) 28a, 28b. Execution units 22a, 22b include various arithmetic units such as fixed-point units and floating-point units, as well as instruction fetch units, branch units and instruction sequencer units. The processor cores may operate according to reduced instruction set computing (RISC) techniques, and may employ both pipelining and out-of-order execution of instructions to further improve the performance of the superscalar architecture. Registers 24a, 24b include general-purpose registers, special-purpose registers, and rename buffers. L1 caches 26a, 26b (which are preferably comprised of separate instruction and data caches for each core) and load/store units 28a, 28b communicate with memory subsystem 14 to read/write data from/to the memory hierarchy. Memory subsystem 14 may include a second level (L2) cache and a memory controller. Processing unit 10 may communicate with other components of the computer system (memory and various peripheral devices) via a system or fabric bus 30. To facilitate repair/replacement of defective processing units in the computer system, processing unit 12 may be constructed in the form of a replaceable circuit board or similar field replaceable unit (FRU), which can be easily swapped, installed in or swapped out of system 10 in a modular fashion.

Processor cores 12a, 12b and memory subsystem 14 (functional units) are clock-controlled components, while scan controller 16 and JTAG interface 18 are free-running components. JTAG interface 18 provides access between an external device such as a service processor and scan controller 16. JTAG interface 18 complies with the Institute of Electrical and Electronics Engineers (IEEE) standard 1149.1 pertaining to a test access port and boundary-scan architecture. Scan controller 16 uses a scan communications extension that is allowed by standard 1149.1. Scan controller 16 is connected to various sets of scan latches located in the clock-controlled components, three of which are shown in FIG. 1. Scan latches 32a and 32b are respectively located in the control logic 20a, 20b of cores 12a, 12b, while additional scan latches 32c are located in memory subsystem 14. Only three sets of scan latches are illustrated for simplicity, but there may be many more located throughout processing unit 10.

Scan controller 16 allows the service processor to access the scan latches while the components are still running, via JTAG interface 18. The scan latches on a given chip are connected in a ring fashion with scan controller 16. The scan latches may include internal control and error registers (along with mode and status registers) which can be used to enable and check various functions in the components. In this manner, the service processor can access any chip in the multi-processing system via JTAG interface 50 and access registers while the system is running, without interruption, to set modes, pulse controls, initiate interface alignment procedures, read status of fault indication registers, etc. Scan controller 16 carries out these functions by setting an internal command register and an internal data register. Assembly code running on a component, particularly in the processor cores 12a, 12b, can allow the cores to utilize scan features as well. Thus a core can read status bits of another component and control the logic anywhere on its own chip. Scan controller 16 includes appropriate logic to arbitrate between JTAG interface 18 and any assembly code commands from the two processor cores.

Information stored in scan latches usually includes mode configurations for clock control logic, and clock control latches can account for a significant fraction of the microprocessor latch count. Microprocessors typically use control logic in local clock buffers to adjust the duty cycle and edge stressing of various clock pulses in the system and thereby meet the requirements of the local logic circuits. These clock buffer modes are set at system power-on using scan controller 16, and often must maintain their logical value for days or months to ensure proper performance of the local logic circuits. However, these values can be upset during microprocessor operation, e.g., from stray radiation or electrostatic discharge. This upset is correctable by scanning a new value, but the system may only allow scanning at power-on, meaning that the system must be restarted if a clock control latch becomes incorrectly set.

Robust latches have been designed with error-correction circuitry to address this problem. The error-correction circuitry generally relies on redundancy, at either the latch level or the device (transistor) level. For example, the latch disclosed in U.S. Pat. No. 5,307,142 uses device level redundancy to achieve single event upset (SEU) immunity. That latch has cross-coupled inverters with voltage dividers that prevent the logic state of a single one of the inverters from changing. In U.S. Pat. No. 6,127,864, a temporally redundant latch samples logic data at multiple time-shifted periods to provide multiple (independent) data samples from which the correct data can be selected. That latch has three sampling circuits that sample the logic data at three different times. The circuit described in U.S. Pat. No. 6,504,411 uses triplicate latches and a majority voting circuit to provide resistance to SEUs. The majority voting circuit indicates a set state for the redundant latch circuit based upon a majority of the latches being in the set state, or otherwise indicates a reset state. A radiation resistant latch is disclosed in U.S. Pat. No. 6,826,090 which uses feedback circuitry to reinforce output signals of sublatches.

These latch designs reduce, but do not eliminate, the problem of upsets. For instance, in a redundant latch structure with a majority voting circuit that holds a logical state for an extended period, it is possible to have two separate upsets over an extended time, i.e., two of the three latches being set to an incorrect value, which then generates an incorrect output at the voting circuit. As a related issue, full redundancy in latch designs may be too costly in terms of physical size (chip area), speed, and power consumption. In modern, leakage power-dominated designs, it becomes increasingly important to reduce or eliminate any unnecessary redundancies. It would, therefore, be desirable to devise an improved latch design having less overhead that could still ensure reliability in case of single event upsets. It would be further advantageous if the latch could correct multiple errors resulting from more than one upset over time.

SUMMARY OF THE INVENTION

It is therefore one object of the present invention to provide an area efficient design for a self-correcting latch.

It is another object of the present invention to provide such a latch design that can handle multiple upsets over time.

It is yet another object of the present invention to provide a self-correcting scan latch which does not rely on external system control.

The foregoing objects are achieved in a method of storing a value, by loading the value into at least three latch stages, generating a latch circuit output value based on at least one of the latch stage outputs, sensing that the latch stage outputs are not all equal and, in response to this sensing, feeding the latch circuit output value back to the inputs of the latch stages to reload the latch stages with the latch circuit output value. The latch circuit may use a not-equal gate whose output is an error signal that can be monitored to determine that a single-event upset has occurred. In the illustrative embodiment a first one of the latch stages (master stage) is controlled by a first multiplexer having a first input which receives a first system clock signal, a second one of the latch stages (slave stage) is controlled by a second multiplexer having a first input which receives a second system clock signal, the slave stage having an input coupled to an output of the master stage, and the latch stage outputs are connected to respective inputs of the not-equal gate, whose output is connected to a second input of the first multiplexer and to a second input of the second multiplexer. The input of the master stage is connected to an output of a third multiplexer having a first input which receives the scan-in data, and the latch stage outputs are connected to respective inputs of a majority gate having an output which is connected to a second input of the third multiplexer. In the exemplary implementation the latch circuit is part of a latch control system having a system clock, and reloading of the latch stages takes less than one cycle of the system clock (less than 500 picoseconds). The latch control system may further comprise a clock generation circuit which creates a master clock signal, a clock distribution network which uses the master clock signal to render a global clock signal, and at least one local clock buffer which adjusts the global clock signal based on the state information stored in the scan latch circuit.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 2:
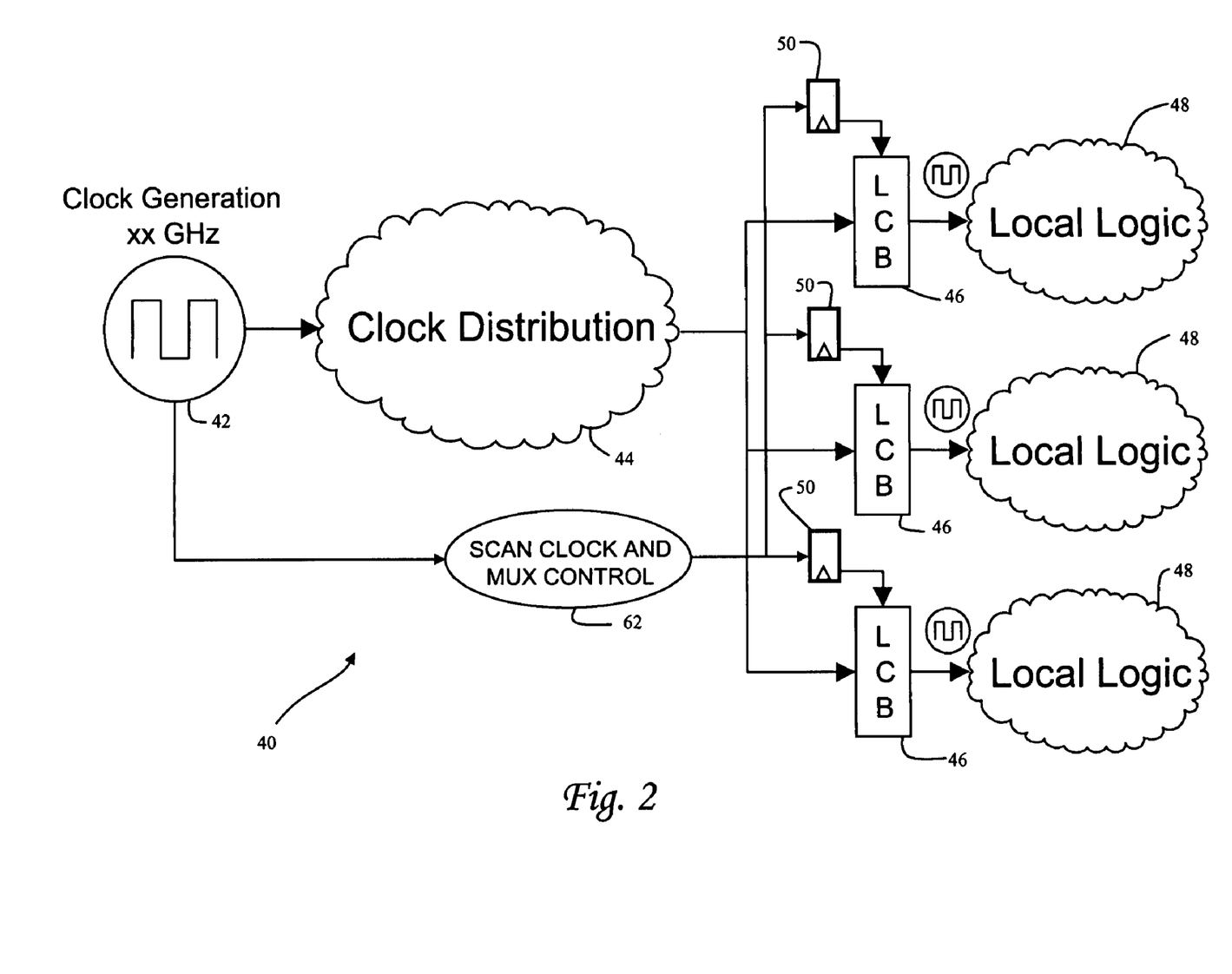
FIG. 2 is a high-level schematic diagram of one embodiment of a clock control system constructed in accordance with the present invention which utilizes self-correcting scan latches to store control information for local clock buffers.

With reference now to the figures, and in particular with reference to FIG. 2, there is depicted one embodiment 40 of a clock control system which utilizes a novel latch circuit constructed in accordance with the present invention. Clock control system 40 is adapted for use within an integrated circuit such as a microprocessor. While clock control system 40 provides one example of how the invention may be implemented, those skilled in the art will appreciate that the invention is not so limited, and may be used in other latch control systems of a microprocessor besides clock control systems.

Clock control system 40 is generally comprised of a clock generation circuit 42, a clock distribution network 44, and a plurality of local clock buffers (LCBs) 46. Clock generation circuit 42 includes a phase-lock loop to create a master clock signal. The master clock signal is fed to the clock distribution network to render synchronized global clock signals at LCBs 46. Each LCB 46 adjusts the global clock duty cycle and edges to meet the requirements of respective local logic circuits 48 (functional units) of the microprocessor. The local logic circuit may be, e.g., memory arrays or execution units of a processor core.

Each LCB has one or more control registers which can be set at power on using respective scan latch circuits 50. Scan latch circuits 50 have a novel construction which provides soft-error immunity and allows periodic refreshing to repair and self-correct any upset element of the latch and restore the latch to its original scanned state.

Figure 3:
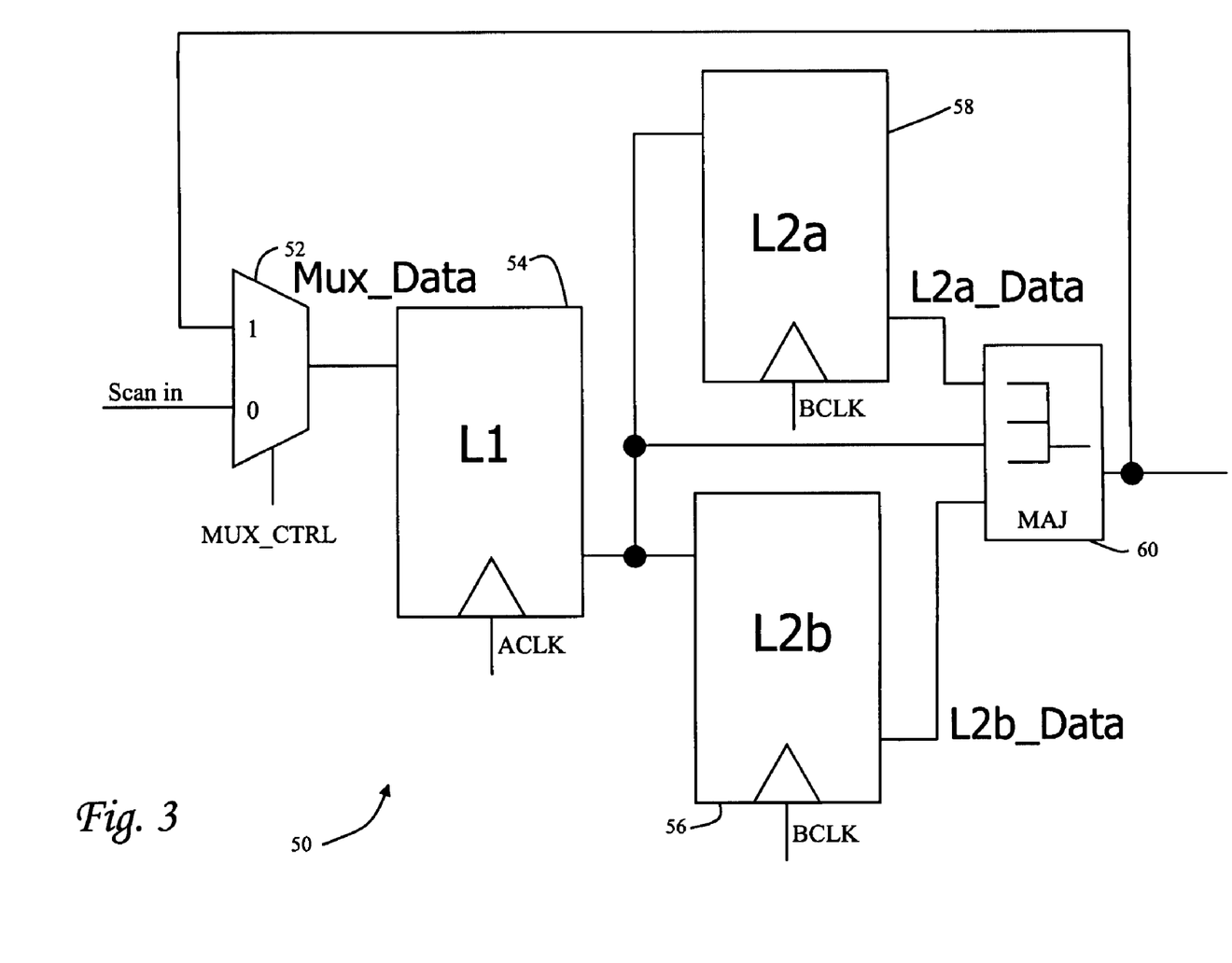
FIG. 3 is a detailed schematic diagram of one embodiment of a self-correcting latch constructed in accordance with the present invention.

One embodiment for scan latch circuit 50 is illustrated in FIG. 3, and is comprised of a 2-to-1 multiplexer 52, a master stage 54, a slave stage 56, a check stage 58, and a majority gate 60. One input to multiplexer 52 is the scan_in line from the computer system's scan ring. The output of multiplexer 52 is the input to master stage 54. The output of master stage 54 is the input for both slave stage 56 and check stage 58, so all of the master, slave and check stage inputs are indirectly coupled to the scan latch data input line. Master stage 54 is controlled by a first clock signal ACLK, while slave and check stages 56, 58 are controlled by a second clock signal BCLK. Master stage 54, slave stage 56 and check stage 58 may be any binary latch design, such as a D flip-flop. During scan mode, ACLK and BCLK are toggled to populate the master-slave latches with the scan_in value which is passed by multiplexer 52 (the multiplexer select signal, MUX_CTRL, is off). The additional check stage stores a copy of the data stored in the slave stage of the latch.

The outputs from master stage 54, slave stage 56 and check stage 58 are fed into the inputs of majority gate 60. The output generated by majority gate 60 is the output of scan latch circuit 50. If any one of the three stages 54, 56, 58 is upset during operation of the system, the output of scan latch circuit 50 still remains correct.

The output of majority gate 60 is also an input to multiplexer 52. During microprocessor operation, ACLK, BCLK and the multiplexer select signal MUX_CTRL are periodically strobed by control logic 62 (see FIG. 2). This action detaches the latches from the scan chain and enables a feedback path which selectively repopulates the master-slave-check latch stages with the majority vote of the values contained in the three stages. In this way, scan latch circuit 50 self-corrects if any one of the stages is upset during microprocessor operation.

Figure 4:
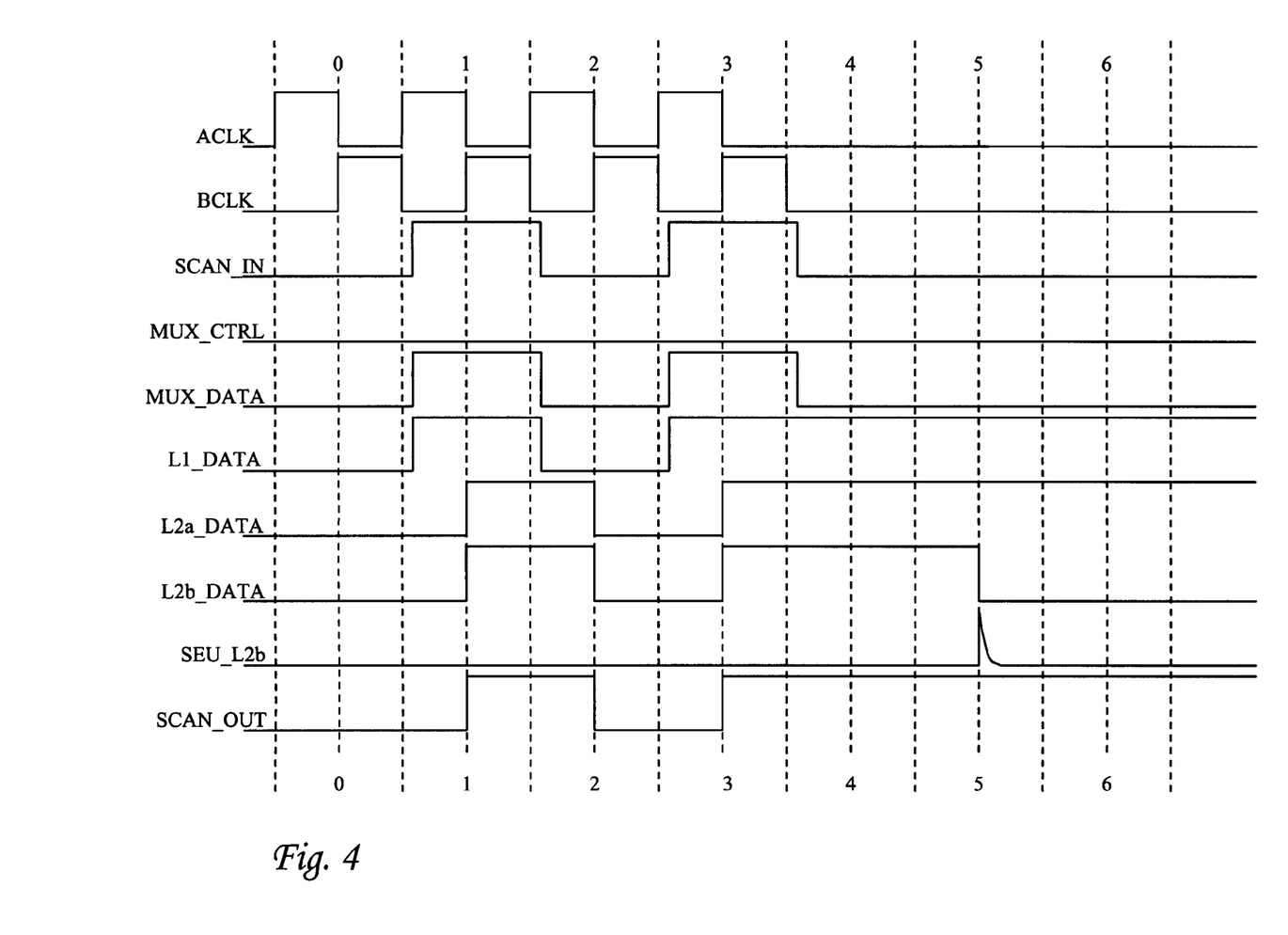
FIG. 4 is a timing diagram illustrating clock, data and control signals for operation of the latch of FIG. 3 with a single event upset.
Figure 5:
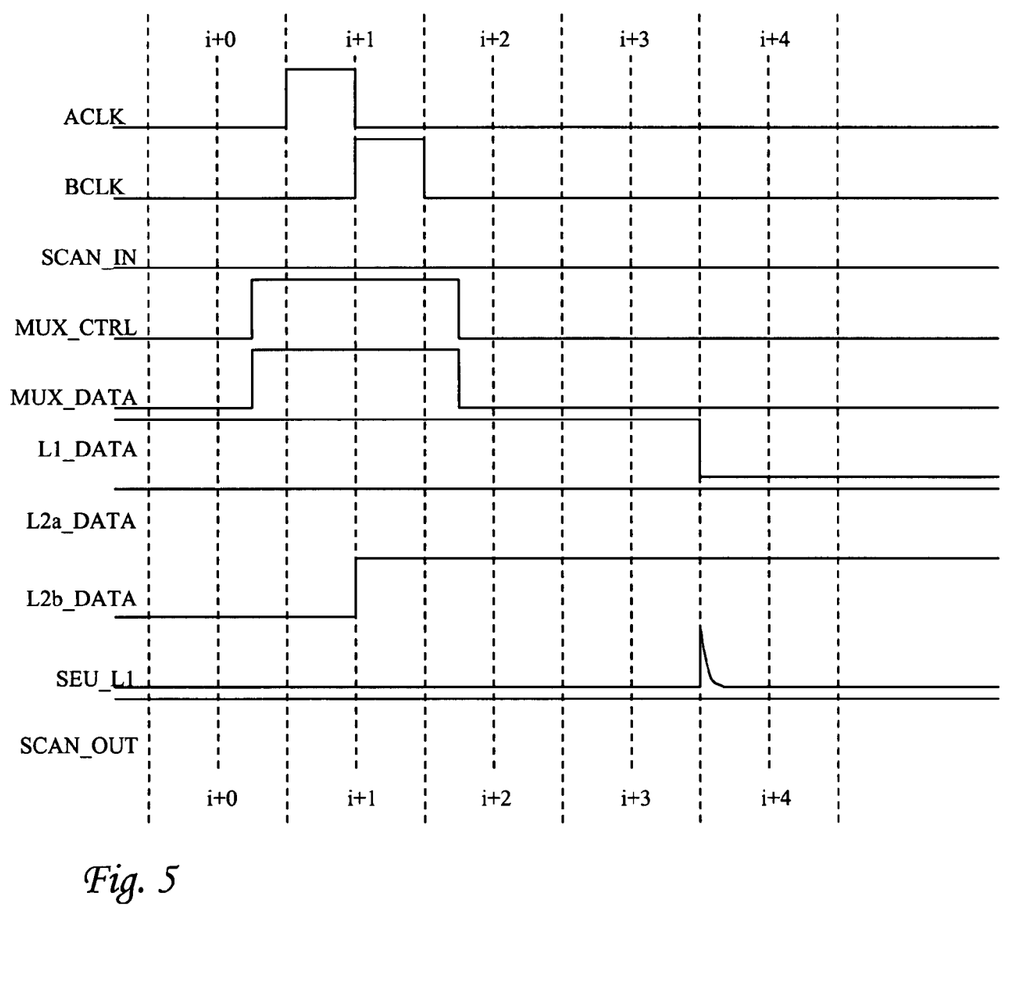
FIG. 5 is a timing diagram illustrating clock, data and control signals for operation of the latch of FIG. 3 with a later single event upset that follows repopulation of the soft-error immune latch.

The present invention may be further understood with reference to the timing diagrams of FIGS. 4 and 5. FIG. 4 illustrates operation of scan latch circuit 50 before and after a single event upset (SEU). The first four cycles in FIG. 4 depict normal scan-in of data into scan latch 50. In cycle 0, a value of logic "0" is scanned into master (L1_DATA) stage 54 when ACLK is active and, since the MUX_CTRL signal is off, the output of multiplexer 52 (MUX_DATA) is "0". This value propagates to the slave and check (L2a_DATA and L2b_DATA) stages 56, 58 in the next half-cycle when BCLK is active. In cycle 2, a value of logic "1" is scanned into master stage 54 when ACLK is again active and the output of multiplexer 52 becomes "1". This value propagates to the slave and check stages 56, 58 in cycle 2 when BCLK is active. This sequence of two loads is repeated in cycles 3 and 4. After data is scanned into all of the latches on the chain, clock signals ACLK and BCLK go low and remain low. At some arbitrary point thereafter (three cycles in this example), a first single even upset occurs (SEU_L2b), which is assumed to affect the contents of slave stage 56. The output of L2b_DATA then flips from "1" to "0", but the output of scan latch 50 (SCAN_OUT) remains "1" due to the operation of majority gate 60.

If a second SEU were to occur while scan latch circuit 50 is in the final state shown in FIG. 4 and caused one of the other stages (master L1 or check L2a) to flip, then two of the stages would be incorrect, and this would result in an erroneous output at majority gate 60. In order to prevent this outcome the present invention refreshes scan latch circuit 50 to correct any upset bits, as shown in FIG. 5. FIG. 5 begins at some cycle i after the scan-in phase started, with the L1_DATA and L2a_DATA signals correctly set high but the L2b_DATA signal incorrectly set low. The refresh phase begins in cycle i+1 when the MUX_CTRL signal is turned on, which feeds the high output of majority gate 60 to the MUX_DATA output. In the first half of cycle i+1 ACLK is toggled which latches the "1" value into master stage 54, and in the second half of cycle i+1 BCLK is toggled which passes this value to slave and check stages 56, 58, resetting the incorrect value held by slave stage 56. The MUX_CTRL signal is then deactivated. Thereafter, when a second upset (SEU2) occurs which flips the contents of master stage 54, the output of the scan latch remains unaffected since the majority gate output is still high.

This repopulation of the stages of scan latch circuit 50 occurs repeatedly at later times to prevent failures that might otherwise arise from multiple upsets over time. Scan latch circuit 50 may be refreshed in a programmable manner or by periodically strobing the clock and control signals, regardless of whether any SEU has actually occurred. The frequency of any periodic strobing can be based on empirical data. An exemplary period is about one hour.

The foregoing embodiment of the inventive latch circuit reduces a scan latch's susceptibility to failure should multiple SEUs occur, and is also smaller than many latches used in the prior art. However, this construction is still susceptible to failure should two events occur before the latch circuit is reset, and the extra logic needed to periodically reset the latch circuit adds system overhead that complicates its implementation. To further reduce susceptibility of failure due to multiple SEUs and to avoid the need for continual system updating, the invention contemplates another embodiment of a self-resetting, self-correcting scan latch which automatically senses when an SEU occurs and resets itself within a relatively short time span, without any system overhead. The susceptibility of this latch to multiple event failures is limited to the extremely low probability that two SEUs occur in the same latch circuit during the short time frame that it takes to reset the latch circuit.

Figure 6:
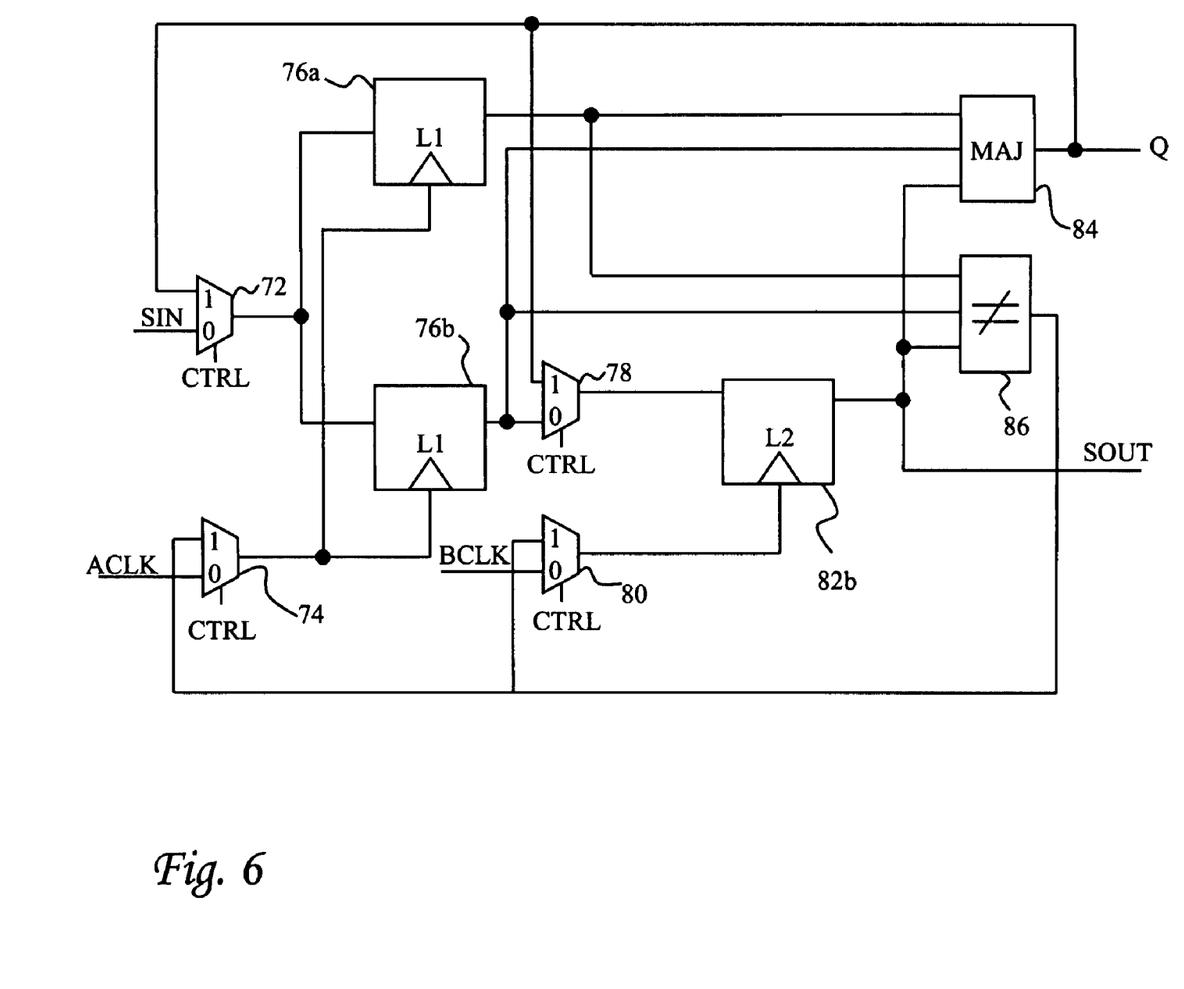
FIG. 6 is a detailed schematic diagram of one embodiment of a self-correcting scan latch constructed in accordance with the present invention.

One embodiment of the self-resetting, self-correcting latch circuit 70 of the present invention is shown in FIG. 6. The scan-in data is an input to a multiplexer 72 which is controlled by a system scan-in control signal. The output of multiplexer 72 is fed to two first-level (L1) latch stages 76a and 76b, each of which is controlled by the ACLK signal via another multiplexer 74. The outputs of L1 latch stages 76a and 76b are both connected to a majority gate 84 and a not-equal gate 86. The output of L1 latch stage 76a is also connected to an input of another multiplexer 78 whose output feeds a second-level (L2) latch stage 82. Latch stage 82 is controlled by the BCLK signal via another multiplexer 80. The output of latch stage 82 is the output SOUT of latch circuit 70, and is also connected to majority gate 84 and not-equal gate 86. The output of majority gate 84 is connected to the second input of each multiplexer 72, 78, while the output of not-equal gate 86 is connected to the second input of each multiplexer 74, 80.

In the scan state, latch circuit 70 behaves like a simple scan latch. The data is scanned through L1 latch stages 76a, 76b and L2 latch stage 82 using ACLK and BCLK. After scan-in has completed, the scan control signal (connected to each select line of multiplexers 72, 74, 78, 80) turns on and effectively disconnects latch circuit 70 from the scan chain, and enables the reset functionality. These latch stages hold a static state, so each latch stage will remain quiescent until an SEU occurs and changes the state of one of the storage elements. After an SEU occurs, not-equal gate 86 senses that the three storage elements have different states, and asserts a high level on the clock inputs to the latch stages (via multiplexers 74, 80), making them transparent. The value determined from the majority gate then resets the stored values in the latch stages (via multiplexers 72, 78). Once the latch stage that was upset by the SEU is corrected, along with the refreshing of the other two latch stages, the not-equal gate detects that all units have the same value and removes the high level on the latch stages so that they can maintain their corrected state. The output signal Q from majority gate 84 drives the local clock buffer or other circuitry that the scan latch is associated with. The scan output does not need to be redundant, but the data output Q is redundant in order to effectuate soft error rate (SER) insensitivity.

Simulations of the operation of latch circuit 80 show this reset occurs within 25-500 picoseconds, which is significant since this time frame is in the same general range as the clock frequency of the clock control system (around 5 GHz in the exemplary implementation). This quick response time means that latch circuit 70 is susceptible to failure only for multiple events occurring during a clock cycle, which is very unlikely. The reset time is dependent on the speed (size) of the transistors and the magnitude of the upset. When one of the latch stages is hit with radiation and faults, not-equal gate 86 takes about 20 ps to switch to high output. If the radiation hit was small and there is little charge to dissipate, then correction will occur quickly. If the radiation hit was large, it will take longer to remove the extra charge and correct the error.

The present invention thus provides a more robust latch design which is extremely reliable against multiple SEUs, yet still has small physical overhead, and requires no external interface from the system. The scan latch can be made even more reliable by employing transistors that are less susceptible to radiation events.

Latch circuit 70 also provides for real-time monitoring when a single-event upset occurs. An error signal can be tapped from not-equal gate 86 and counted by an external error register to determine where and how many events have occurred. This feature allows the designer to know, after a system failure or system audit, if some event has disrupted the latches of the microchip.

Figure 7:
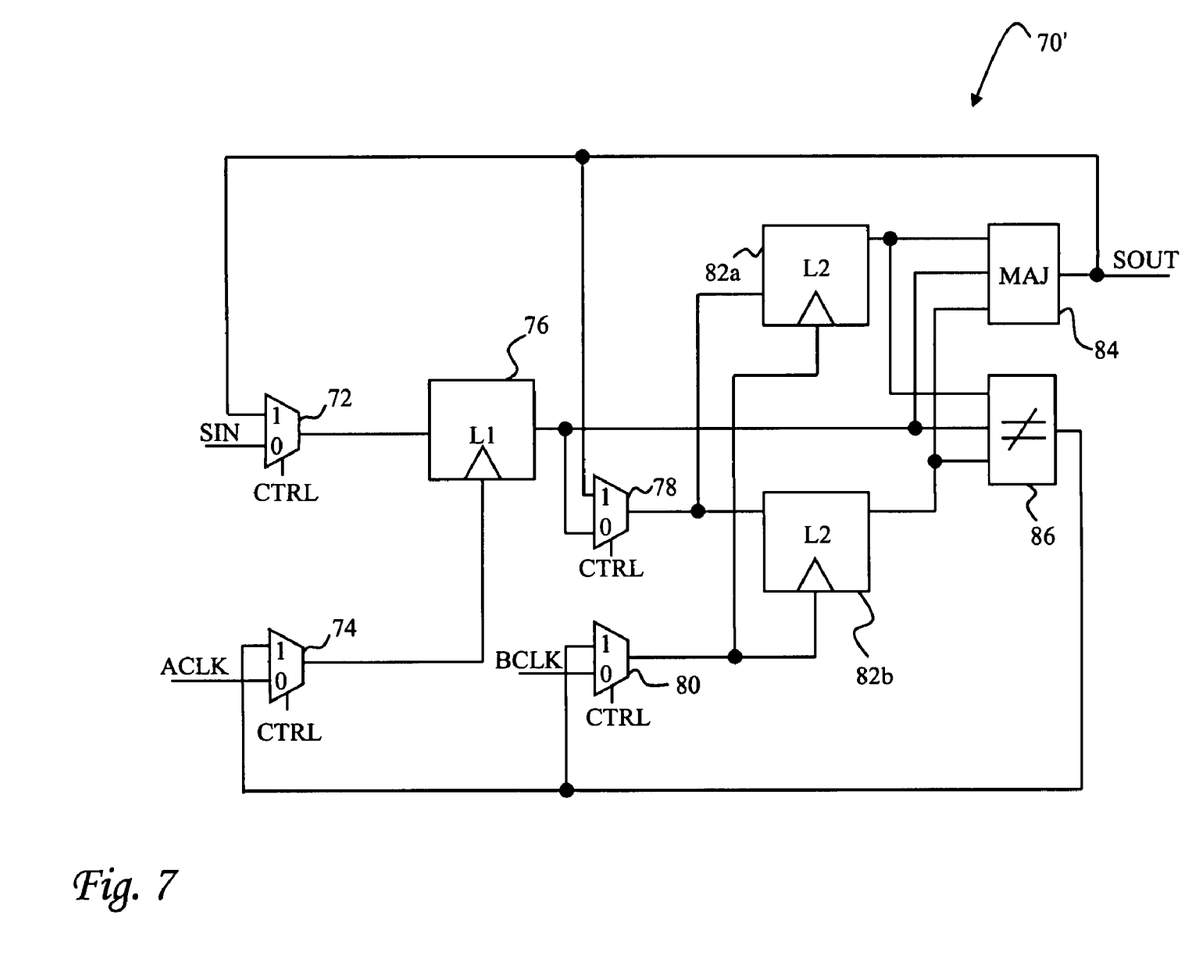
FIG. 7 is a detailed schematic diagram of another embodiment of a self-correcting scan latch constructed in accordance with the present invention.

The embodiment of FIG. 6 might suffer from a timing problem during scan-in, after the data is latched into L1 stages 76a, 76b but not yet into L2 stage 82, since this may activate not-equal gate 86. This problem can be avoided if the system is running only under the scan clock. However, an alternative embodiment can be used to eliminate this concern, as shown in FIG. 7. Latch circuit 70' operates in the same general manner as latch circuit 70, but in latch circuit 70' when scanning in data the feedback path is disconnected from the remainder of the circuit. Latch circuit 70' has a single L1 latch stage 76, and two L2 latch stages 82a and 82b. Each of the latch stages is again fed to both majority gate 84 and not-equal gate 86. The output of majority gate 84 is the output of latch circuit 70'. After scan-in, a change in any of the latch states causes the not-equal gate to make the latches transparent, resetting all blocks to the majority value. Once the proper state has been restored, the latch stages become storage elements again.

Instead of using multiplexers to feed the ACLK and BCLK signals, the clocks can be combined in a logical OR fashion if the output of not-equal gate 86 is disabled during scan in. In a further embodiment, multiplexer 78 is removed (i.e., the first latch stage directly feeds the second latch stage), but this construction leaves the possibility of a race if an SEU occurs at the first stage level. When resetting, an erroneous value in L1 can potentially race to store the upset value in L2 before L1 is reset. To avoid this problem, a delay can be inserted between the time L1 is made active for reset and L2 is activated.

Figure 8:
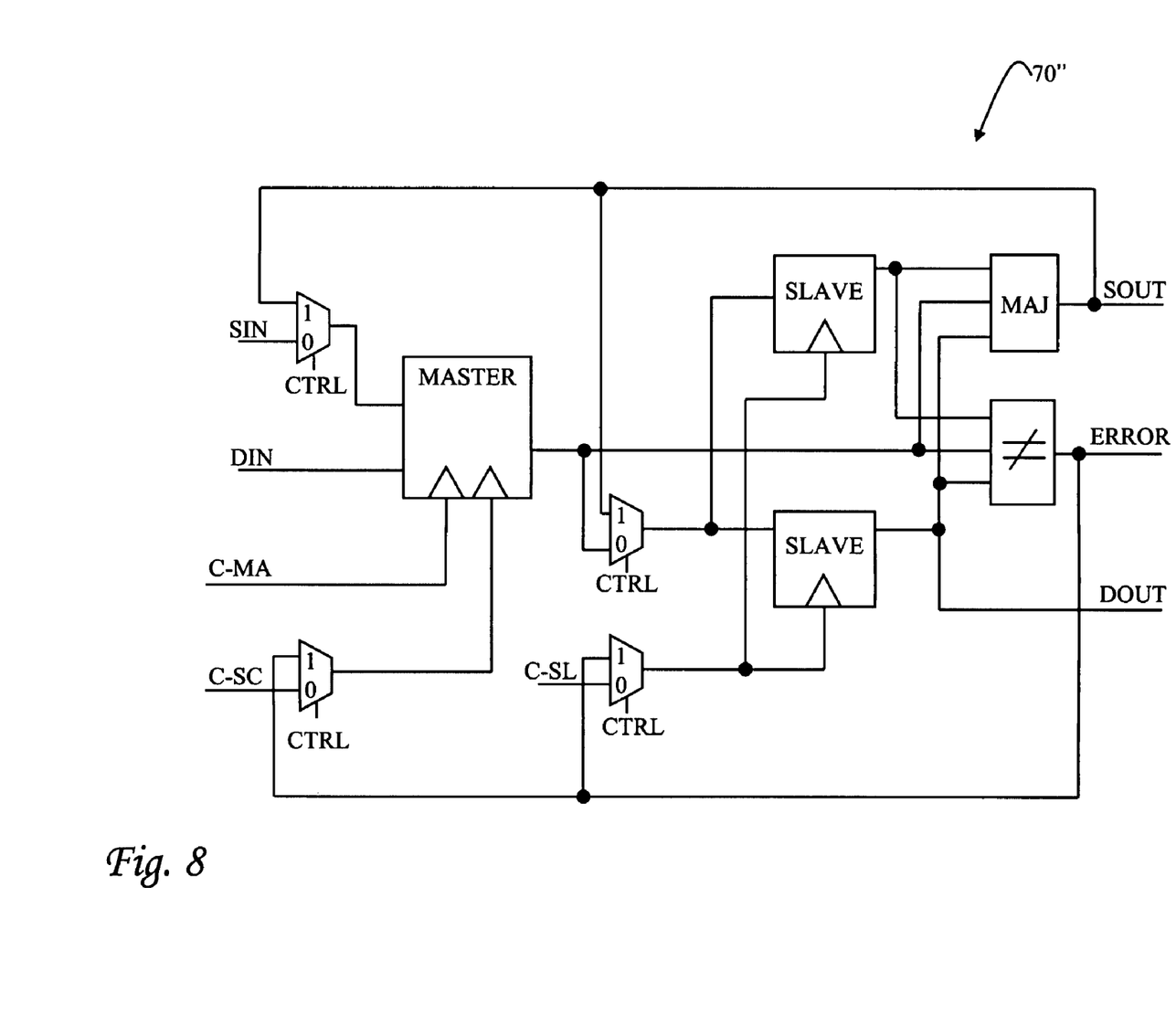
FIG. 8 is a detailed schematic diagram of yet another embodiment of a generally purpose self-correcting latch constructed in accordance with the present invention.

The novel latch design of the present invention also beneficial for boundary latches that may be inactivate for a time, but that must have the correct value after the inactive period, for example, the reservation station to a block of logic that is clock gated, or a latch that stores configuration or state information that must hold the value while a functional unit is in a power-down state. These latches, unlike scan latches, perform like a master-slave latch under local clock buffer control. While operating, their data value changes regularly and statistically they are not as much at risk to SEU failure. However, when a block is powered-down or put into a clock gate and the state or boundary latch must hold the current data until reset is completed, it becomes as susceptible as scan latches. The invention can be applied to this configuration in a different embodiment as shown in FIG. 8, which illustrates a general purpose self-correcting latch 70". Self-correcting latch 70" utilizes the same principle as scan latch 70 and 70', but operates where a general purpose latch would. The normal mode for self-correcting latch 70" is to use the master and a single slave as the storage elements. The redundancy is placed in the scan path which is slower so as to not impact the speed of the latch. While operating, the latch is nearly as fast as a standard latch, only somewhat larger due to the redundancy. If the redundancy is important for the data output for some application, the SOUT and DOUT outputs can be merged, but doing so will add the delay of the majority gate to the latch delay. When self-correcting latch 70" is put into its standby state, the clock control is turned over to the ERROR signal. When the non-equal gate detects any one of the latches change states, it corrects that latch and refreshes the other two.

The multiplexers on the scan and slave clocks can be removed from self-correcting latch 70" if the clock control is moved into the local clock buffer driving the latch. In this latter scenario, the ERROR signal of a block of latches can be ORed back to the LCB. When an error occurs, the LCB generates the appropriate clocks to correct the latch (a scan clock signal C_SC, a master clock signal C_MA, and a slave clock signal C_SL). In this manner, monitoring is still provided while the size of each latch is decreased since the multiplexers are removed. This general purpose latch can also be implemented with redundant master (L1) stages instead of redundant slave (L2) stages.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the latch illustrated in FIG. 3 has a redundant L2 stage, but the invention may also be implemented with a redundant L1 stage (i.e., with the output of the front-end multiplexer feeding two L1 latch stages with only one L2 latch stage). It is therefore contemplated that such modifications can be made without departing from the spirit or scope of the present invention as defined in the appended claims.

What is claimed is:

1. A self-resetting latch circuit comprising:
   a data input line;
   at least first, second and third latch stages having inputs coupled to said data input line;

a majority gate which receives outputs from said first, second and third latch stages and generates a majority output value;

a not-equal gate which receives said outputs from said first, second and third latch stages and activates an error line when one of said latch stage outputs is not equal to another one of said latch stage outputs; and a feedback circuit responsive to said error line which repopulates said latch stages with the majority output value after data has been loaded into the latch circuit.

2. The self-resetting latch circuit of claim 1 wherein the latch circuit is a scan latch that is part of a scan ring.

3. The self-resetting latch circuit of claim 1 wherein:
said latch stages are part of a latch control system having a system clock; and
said feedback circuit takes less than one cycle of the system clock to repopulate said latch stages.

4. The self-resetting latch circuit of claim 1 wherein said feedback circuit takes less than 500 picoseconds to repopulate said latch stages.

5. The self-resetting latch circuit of claim 1 wherein:
said first latch stage is controlled by a first multiplexer having a first input which receives a first system clock signal;
said third latch stage is controlled by a second multiplexer having a first input which receives a second system clock signal, said input of said third latch stage being coupled to said output of said first latch stage; and
said error line is connected to a second input of said first multiplexer and to a second input of said second multiplexer.

6. The self-resetting latch circuit of claim 5 wherein:
said input of said first latch stage is connected to an output of a third multiplexer having a first input which receives said data input line; and
said majority gate output value is connected to a second input of said third multiplexer.

7. A latch control system for a microprocessor having a plurality of functional units, comprising:
at least one scan latch circuit located in a functional unit, said scan latch circuit storing state information used to control the functional unit, and having a master stage, a slave stage, a check stage, and reset logic which makes a determination that a first value in one of said master, slave and check stages is not equal to a second value in a different one of said master, slave and check stages, and refreshes said master, slave and check stages in response to the determination; and
a scan clock signal which controls said reset logic to selectively scan the state information from a data input line into said master, slave and check stages.

8. The latch control system of claim 7 wherein:
the functional unit has a system clock; and
said reset logic takes less than one cycle of said system clock to refresh said master, slave and check stages.

9. The latch control system of claim 7 wherein said reset logic takes less than 500 picoseconds to refresh said master, slave and check stages.

10. The latch control system of claim 7 wherein:
said master stage is controlled by a first multiplexer having a first input which receives a first system clock signal;
said slave stage is controlled by a second multiplexer having a first input which receives a second system clock signal, said input of said slave stage being coupled to said output of said master stage; and
said reset logic includes an error line connected to a second input of said first multiplexer and to a second input of said second multiplexer, wherein said error line goes active in response to the determination.

11. The latch control system of claim 10 wherein said error line is an output of a not-equal gate having three inputs which respectively receive outputs of said master, slave and check stages.

12. The latch control system of claim 10 wherein:
an input of said master stage is connected to an output of a third multiplexer having a first input which receives said data input line; and
a second input of said third multiplexer receives an output of a majority gate having three inputs which respectively receive outputs of said master, slave and check stages.

13. The latch control system of claim 7 wherein the scan latch circuit stores clock control information, and further comprising:
a clock generation circuit which creates a master clock signal;
a clock distribution network which uses the master clock signal to render a global clock signal; and
at least one local clock buffer which adjusts the global clock signal based on the state information stored in said scan latch circuit.

* * * * *